(12) United States Patent
Miller et al.

(10) Patent No.: US 6,397,622 B1
(45) Date of Patent: Jun. 4, 2002

(54) WATER FLOW FOR AUGER TYPE POULTRY CHILLER

(75) Inventors: Michael E. Miller, London; Andrew C. Estes, Russellville, both of AR (US)

(73) Assignee: Cooling & Applied Technology, Inc., Russellville, AR (US)

( * ) Notice: Subject to any disclaimer, the term of this patent is extended or adjusted under 35 U.S.C. 154(b) by 0 days.

(21) Appl. No.: 09/637,345

(22) Filed: Aug. 11, 2000

(51) Int. Cl.[7] ............................................... F25B 25/02
(52) U.S. Cl. ............................................. 62/381; 62/63
(58) Field of Search ..................................... 62/63, 381

(56) References Cited

U.S. PATENT DOCUMENTS

| | | | |
|---|---|---|---|
| 2,942,429 A | * | 6/1960 | Van Dolah et al. ............ 62/381 |
| 4,569,204 A | * | 2/1986 | Ott et al. ...................... 62/381 |
| 4,697,508 A | * | 10/1987 | Tallafus ........................ 62/381 |
| 4,788,831 A | | 12/1988 | Crawford et al. |
| 4,827,727 A | | 5/1989 | Caracciola |
| 4,849,237 A | | 7/1989 | Hurst |
| 4,860,554 A | | 8/1989 | Innes et al. |
| 5,390,900 A | | 2/1995 | Ginzburg |
| 5,484,615 A | | 1/1996 | Kounev |
| 5,562,010 A | | 10/1996 | McGuire |
| 5,857,350 A | | 1/1999 | Johnson et al. |
| 5,868,000 A | | 2/1999 | Morris, Jr. et al. |
| 6,089,037 A | | 7/2000 | Miller et al. |

* cited by examiner

Primary Examiner—Ronald Capossela
(74) Attorney, Agent, or Firm—Ray F. Cox, Jr.

(57) ABSTRACT

A counter flow, re-circulating, externally refrigerated auger type chiller. The chiller has a tank that is semi-cylindrical in shape so that the walls of the tank conform closely to the circular cross section of the auger. By minimizing the gap between the walls of the tank and the outer edges of the rotating auger, the counter flowing chilled water is forced to flow in the helical path determined by the auger. This assures a longer residence time for the chilled water in the auger, more thorough and more intimate contact between the poultry carcasses and the chilled water, and thus more efficient transfer of heat from the poultry carcasses to the chilled water.

2 Claims, 4 Drawing Sheets

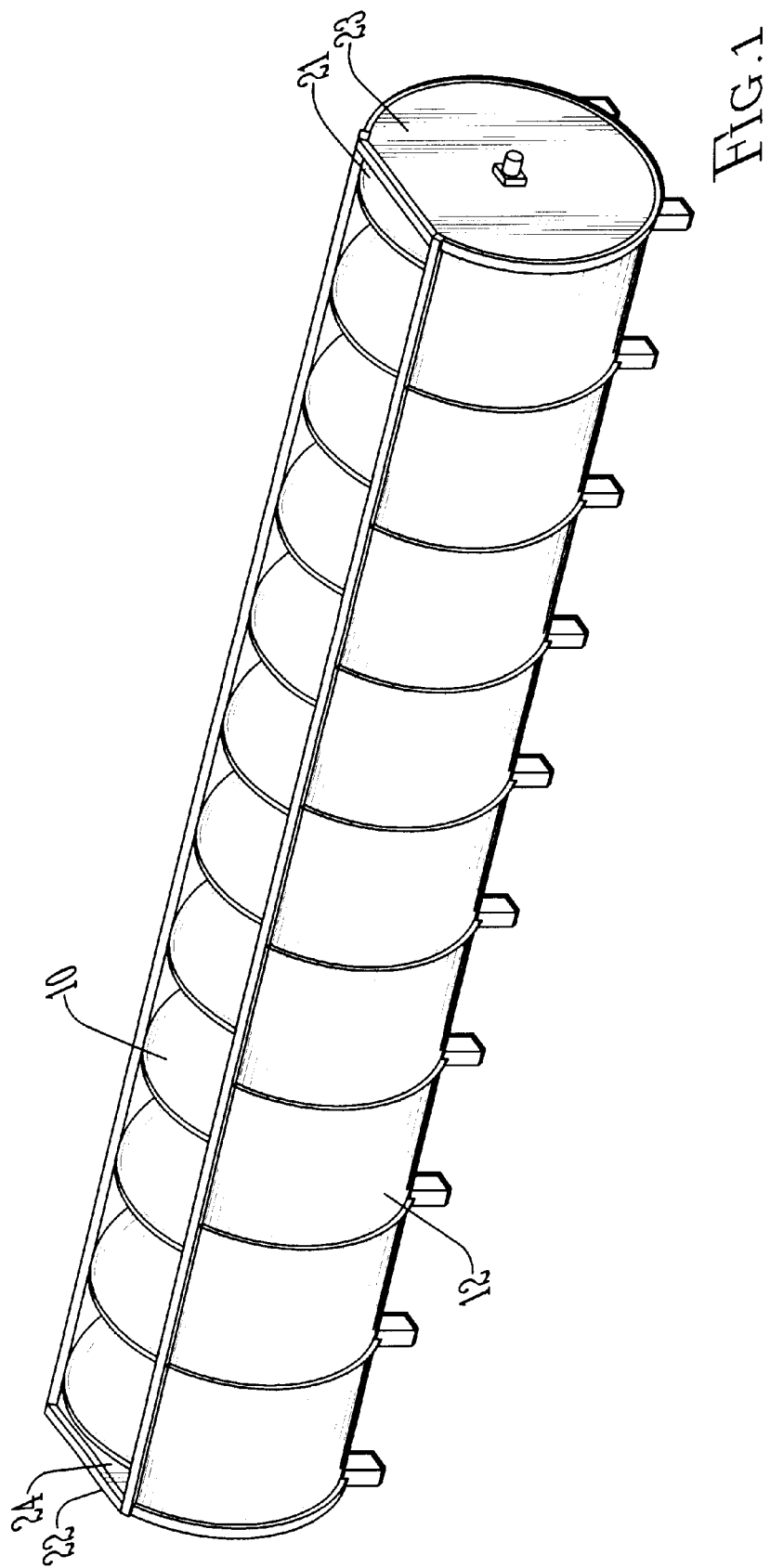

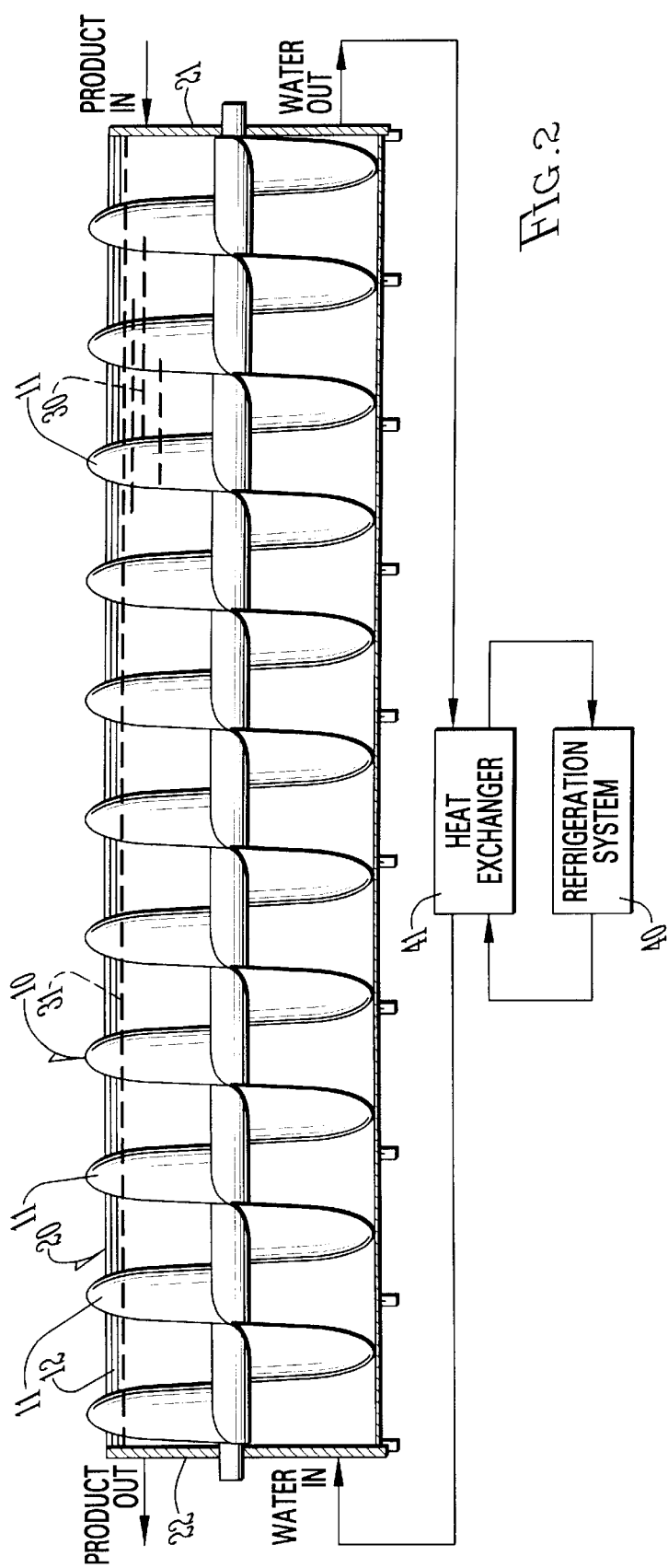

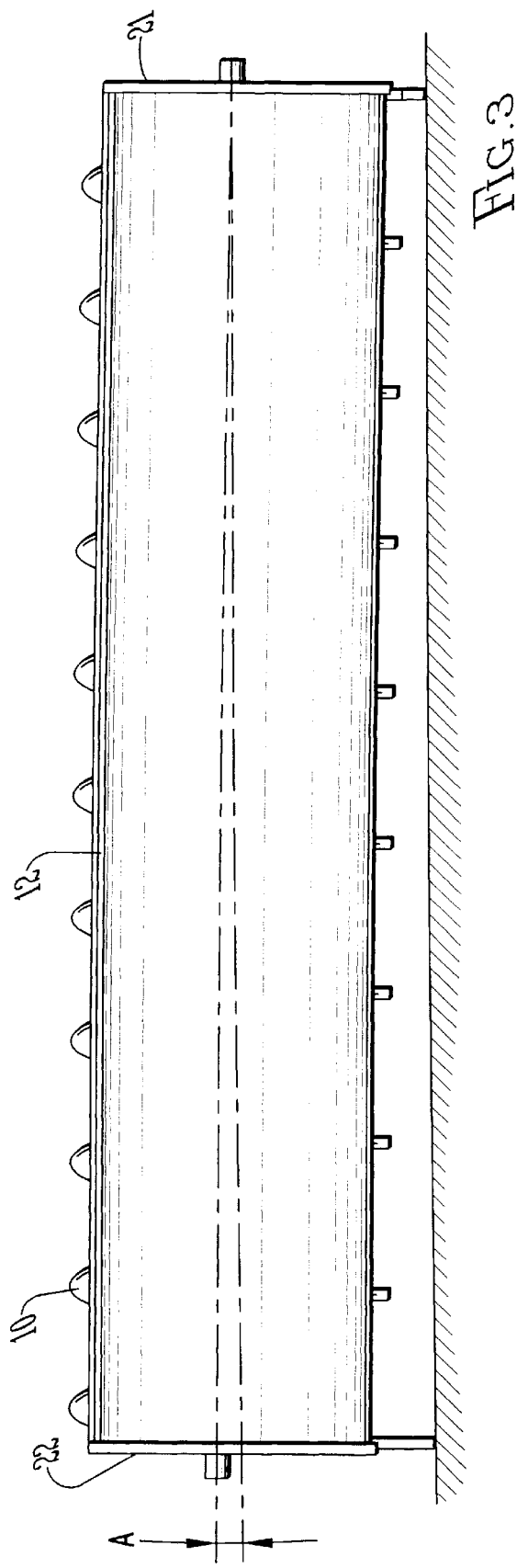

US 6,397,622 B1

WATER FLOW FOR AUGER TYPE POULTRY CHILLER

BACKGROUND OF THE INVENTION

The present invention relates to auger type poultry chillers using a counter flow chilled water bath to chill poultry carcasses, and in particular, to the type of poultry chiller in which the chilled water is re-circulated through an external refrigeration unit.

In the processing of poultry for human consumption, it is necessary that the slaughtered, eviscerated poultry carcasses be chilled as rapidly as possible. Various types of poultry chillers to accomplish the chilling of freshly killed poultry are known in the art. Poultry chillers typically employ chilled water to reduce the temperature of the poultry carcasses. For example, U.S. Pat. No. 4,788,831 discloses a drag type chiller in which a series of moving rakes advance the poultry carcasses through a tank of chilling liquid.

Another type of chiller is the auger type as disclosed in U.S. Pat. No. 5,868,000 in which an auger having a series of flights forms a generally helical structure that when rotated moves the poultry carcasses through a chilled water bath. Similar chillers are disclosed in U.S. Pat. Nos. 4,860,554 and 5,484,615.

In some chillers, the chilled water bath is not circulated, i.e., the water either remains in the chiller or is used one time only and discharged. The more common type, however, re-circulates the chilled water. The chilled water may either be circulated through the chiller in the same direction as the movement of the poultry carcasses, as shown in U.S. Pat. No. 4,827,727, or more commonly, in a counter flow in which the chilled water and the poultry carcasses move through the chiller in opposite directions. Such counter flow chillers are disclosed in U.S. Pat. Nos. 4,788,831; 5,868,000; and 4,860,554. Counter flow is known to more efficiently transfer heat from the poultry carcasses to the chilled water.

Two primary means are used to chill the water. One type, exemplified by U.S. Pat. No. 4,860,554, applies cooling to the walls of the chiller, such as by refrigeration coils built into the walls of the chiller or by using a jacket around the walls of the chiller in which a cooling fluid circulates.

In the other type of chiller, the chilled water is sent from the chiller to an external refrigeration source, such as an ammonia refrigeration system, that reduces the temperature of the water that is then re-circulated to the chiller. The external refrigeration may be supplied through a heat exchanger and refrigeration unit such as shown in U.S. Pat. No. 4,788,831. The chilled water enters the chiller at one end, circulates through the chiller, and after being warmed by contact with the poultry carcasses, exits the chiller. The warmed water is again chilled by the refrigeration unit and re-circulated through the chiller.

In auger type chillers, the poultry carcasses tend to sink toward the bottom of the chiller or to clump. In order to obtain maximum efficiency in transferring heat from the poultry carcasses to the chilled water, it is desirable to force the chilled water into intimate contact with the poultry carcasses. This becomes difficult to achieve if the poultry carcasses settle to the bottom of the chiller. Some attempts to solve this problem use air agitators to turbulently tumble the poultry carcasses through the chiller. Other techniques use paddles or other structures to encourage more thorough mixing of the poultry carcasses with the chilled water. It has not been generally recognized, however, that a significant mechanism that reduces the efficiency of heat transfer from the poultry carcasses to the chilled water is inherent in the design of the counter flow auger type chillers which re-circulate the chilled water through an external refrigeration unit.

In this type of prior art counter flow, re-circulating, externally refrigerated auger chiller, the auger rotates in a tank that is generally U-shaped in cross sectional outline, square shaped such as in U.S. Pat. No. 5,484,615, or some other shape that does not conform closely to the outer edges of the auger. U.S. patent application Ser. No. 09/298,364, filed Apr. 23, 1999, which is incorporated herein by reference, discloses a U-shaped tank. U.S. Pat. No. 5,868,000 also appears to show the U-shaped type of tank in which the outline is circular up to approximately the level of the centerline of the auger. From this point upward, the walls of the U-shaped tank are substantially vertical. This arrangement has some mechanical advantages, such as allowing the auger to be easily removed from the tank since the walls of the tank are never narrower than the width of the auger. Another advantage is that the vertical walls lend themselves to the attachment of catwalks for movement of personnel around the chiller for maintenance and other tasks. One disadvantage of this design is that the vertical walls tend to be susceptible to bending and require expensive reinforcement to maintain the necessary structural integrity of the chiller. Another disadvantage is that the shape tends to be inefficiently loaded in that there are limits to how high the water level in the chiller can be and this in turn limits the quantity of poultry carcasses that can be loaded into the chiller at one time. Increasing the loading potential of the chiller requires a larger chiller that cannot be accommodated in the same "footprint." This can be a significant factor in facilities where space is at a premium.

From the point of view of efficiently cooling the poultry carcasses, the significant disadvantage of the prior art design of counter flow, re-circulating, externally refrigerated auger chillers is that when the walls of the tank do not conform closely to the outer edges of the chiller, two or more triangular shaped gaps are left between the upper walls of the tank and the outer edges of the auger. The chilled water thus tends to take the path of least resistance and to flow between the upper walls of the tank and the outer edge of the auger. By contrast the optimum path of the chilled water through the chiller is a helical path conforming to the flights of the auger. Such a helical path forces a more thorough and intimate contact between the chilled water and the poultry carcasses, even if the carcasses clump toward the bottom of the chiller.

Chillers having walls of semi-cylindrical cross sectional outline are known in the art. For example, U.S. Pat. No. 4,860,554 discloses a counter flow poultry chiller having a semi-cylindrical tank. This chiller is chilled by cooling the walls of the tank directly by refrigeration coils mounted to the exterior walls of the tank. U.S. Pat. No. 4,827,727 also discloses a tank with a semi-cylindrical shape and in which the chilled water is re-circulated to an external heat exchanger. The chilled water and product flow concurrently rather than in a counter-flow arrangement. Chillers manufactured by Barker and Stork Gamco are known in which a semi-cylindrical tank is chilled by liquid circulating through a jacket of double tank walls.

The limitations of the prior art are overcome by the present invention as described below.

SUMMARY OF THE INVENTION

The present invention is a counter flow, re-circulating, externally refrigerated auger type chiller. The chiller has a tank that is semi-cylindrical in shape so that the walls of the tank conform closely to the circular cross section of the auger. By minimizing the gap between the walls of the tank and the outer edges of the rotating auger, the counter flowing chilled water is forced to flow in the helical path determined by the auger. This assures a longer residence time for the chilled water in the auger, more thorough and more intimate contact between the poultry carcasses and the chilled water, and thus more efficient transfer of heat from the poultry carcasses to the chilled water.

Such a design also has the added advantages of a more rigid structure that requires less structural reinforcement and more efficient loading of the chiller due to the more efficient geometry of the semi-cylindrical shape of the chiller tank.

Since the design of the present invention forces the chilling water to flow in a helical path along the flights of the auger and denies the more direct path around the auger found in the prior art, the chilling water naturally is subjected to greater head loss in the course of passing through the chiller. As a result the water level at the exit end of the chiller, where the chilling water is introduced, will be higher than at the inlet end of the chiller, where the warmed chilling water leaves the chiller. In an alternative embodiment of the present invention, this effect is alleviated by sloping the chiller downwardly from the exit end to the inlet end.

It is therefore an object of the present invention to provide for a counter flow, re-circulating, externally refrigerated auger type chiller having a semi-cylindrical shape for a more efficient flow path for the chilled water through the poultry carcasses.

It is a further object of the present invention to provide for a counter flow, re-circulating, externally refrigerated auger type chiller with a tank having a semi-cylindrical shape to more efficiently transfer heat from the chilled water to the poultry carcasses.

It is also an object of the present invention to provide for a counter flow, re-circulating, externally refrigerated auger type chiller with a tank having a semi-cylindrical shape to more efficiently load poultry carcasses into the chiller.

It is a still further object of the present invention to provide for a counter flow, re-circulating, externally refrigerated auger type chiller with a tank having a semi-cylindrical shape for greater structural integrity while minimizing the use of reinforcement materials.

These and other objects and advantages of the present invention will be apparent from a consideration of the following detailed description of the preferred embodiments in conjunction with the appended drawings as described following.

BRIEF DESCRIPTION OF THE DRAWINGS

FIG. 1 is a three dimensional view of the auger type chiller of the present invention.

FIG. 2 is a schematic diagram of an auger type chiller with counter flow re-circulating chilling water and external refrigeration.

FIG. 3 is a side elevation view of the auger type chiller of the present invention showing an alternative embodiment in which the chiller is sloped from the outlet end downwardly toward the inlet end.

DETAILED DESCRIPTION OF THE PREFERRED EMBODIMENTS

Figure 5:
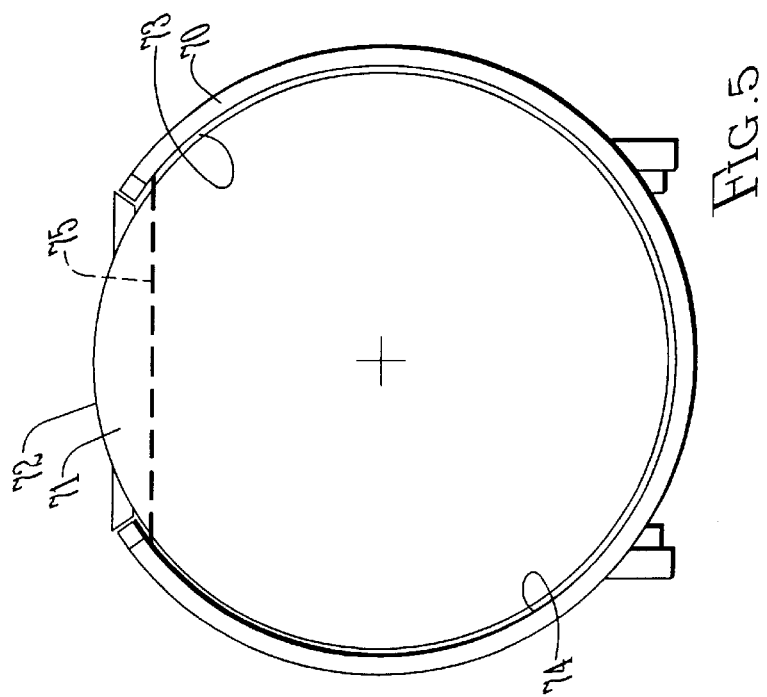
FIG. 5 is a cross sectional end view of the chiller of the present invention.

The preferred embodiment of the present invention may be described with respect to FIGS. 1 and 2. FIG. 2 is a schematic diagram of an auger type chiller in which an auger 10 is mounted for rotation in a tank 20. The auger 10 may comprise one or more flights 11 which together form a helical structure. The tank 20 includes longitudinal walls 12. The tank 20 is filled with chilling water 30 to a level 31.

The tank 20 has an inlet end 21 where the food product, such as freshly killed poultry carcasses (not shown), is introduced into the tank 20. The tank 20 has an outlet end 22 where the poultry carcasses are removed from the tank 20. The inlet end 21 is closed with an inlet wall 23 and the outlet end 22 is closed with an outlet wall 24. The tank 20 therefore comprises the longitudinal walls 12, the inlet wall 23, and the outlet wall 24. The terms "inlet" and "outlet" are given with reference to the points of introduction and removal, respectively, of the poultry carcasses. The auger 10 is rotated within the tank 20 so that the poultry carcasses are moved from the inlet end 21 to the outlet end 22. In the process, the poultry carcasses transfer heat to the chilling water 30 and are cooled thereby.

The chilling water 30 is discharged from the tank 20 at the inlet end 21. At this point the chilling water 30 has been warmed by contact with the freshly killed poultry carcasses. The chilling water 30 is then circulated to a refrigeration system 40, which may be, for example, an ammonia refrigeration unit. The refrigeration system 40 may provide refrigeration to the warmed chilling water 30 directly or may operate through a heat exchanger 41. The refrigerated chilling water 30 exits from the refrigeration system and is re-circulated to the outlet end 22 of the tank 20. At this point the poultry carcasses have been cooled and are removed from the tank 20. Since the chilling water 30 is newly refrigerated at this point, the maximum transfer of heat from the poultry carcasses to the chilling water is possible. As the chilling water 30 moves from the outlet end 22 to the inlet end 21, it moves counter to the direction of motion of the poultry carcasses. Such a counter flow is known to maximize the transfer of heat from the poultry carcasses to the chilling water 30.

Figure 4:
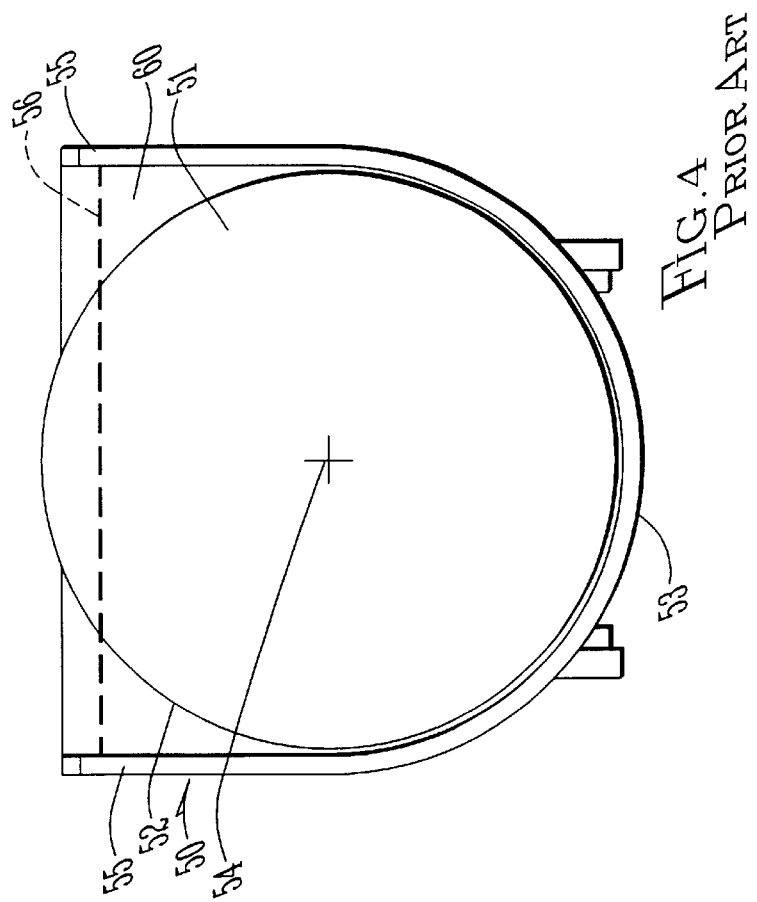
FIG. 4 is a cross sectional end view of a prior art chiller.

With respect to FIG. 4, the prior art type of chiller may be described. The prior art chiller 50 is shown schematically in end view cross section. The auger 51 has outer edges 52 which seen in end view cross section define a circle. The prior art chiller has a tank 53 in which the longitudinal walls (not shown) have a cylindrical shape up to approximately the center line 54 of the axis of rotation of the auger 51. From this elevation upward, the longitudinal walls of the tank 53 are substantially vertical. The vertical portions 55 extend above the normal level 56 of the chilling water. It may be seen from FIG. 4 that a vertical portion 55 of the longitudinal walls, the water level 56 and outer edge 52 of the auger 51 together define a roughly triangular area 60. The triangular area 60 extends through the chiller from the inlet end (not shown) to the outlet end (not shown). The triangular area 60 thus provides a path through the chiller which bypasses the longer helical route around the flights of the auger 51. The chilling water naturally tends to follow the easier route and thus is inefficiently routed away from the most desirable route around the auger where contact with the poultry carcasses is desired for maximum heat transfer.

The present invention is described with reference to FIG. 5 where the longitudinal walls 70 form a semi-cylinder which conforms closely to the outer edges 72 of the auger 71 up to at least the normal water level 75 of the chilling water. The gap 73 between the inner surface 74 of the longitudinal walls 70 and the outer edges 72 of the auger 71 is minimized to avoid providing an alternative path for the chilling water through the chiller. A gap 73 of 1½ inches for a ten feet diameter auger has been found to be acceptable. With this geometry, the chiller is configured for maximum efficiency in the transfer of heat from the poultry carcasses to the chilling water.

Since the design of the present invention forces the chilling water to flow in a helical path along the flights of the auger 10 and denies the more direct path around the auger 10 found in the prior art, the chilling water naturally is subjected to greater head loss in the course of passing through the chiller. As a result the water level at the outlet end 22 of the chiller, where the chilling water is introduced, will be higher than at the inlet end 21 of the chiller, where the warmed chilling water leaves the chiller. In an alternative embodiment shown in FIG. 3, the chiller tank is sloped from the outlet end 22 downward to the inlet end 21 at an angle A from the horizontal. An optimum slope has been found to be approximately 1½ inches in 10 feet. This slope alleviates the effect of the increased head loss in the chilled water moving through the chiller. It also has an additional advantage in cleaning the chiller tank 12. The lower end of the tank 12 serves to hold a reservoir of water during cleaning operations. The slope also assists in the drainage of water from the tank 12.

Although the preferred embodiments of the present invention are described with reference to chillers for poultry carcasses, the present invention is not so limited. A chiller of the present invention may also be used for other types food products, such as hams.

The present invention has been described with reference to certain preferred and alternative embodiments that are intended to be exemplary only and not limiting to the full scope of the present invention as set forth in the appended claims.

What is claimed is:

1. An auger type food product chiller, comprising:

a tank comprising longitudinal side walls having an inlet end and an outlet end, an inlet wall closing said inlet end, an outlet wall closing said outlet end, wherein said longitudinal side walls, said inlet wall and said outlet wall together form a semi-cylinder having an inner surface and an outer surface;

an auger comprising at least one flight having outer edges, said auger mounted for rotation within said tank and having an axis of rotation whereby rotation of said auger moves a food product from said inlet end of said tank to said outlet end of said tank, wherein said inner surface of said tank side walls conforms closely to said outer edges of said one or more flights of said auger;

means for removing the food product from said outlet end;

means for discharging chilling water from said inlet end of said tank;

refrigerating means external to said outer surface of said tank for refrigerating the chilling water discharged from said inlet end of said tank;

means for re-circulating chilling water from said refrigerating means and introducing chilling water into said outlet end of said tank.

2. The auger type food product chiller of claim 1, further comprising means for sloping said tank from said outlet end downwardly toward said inlet end.

* * * * *

US006397622C1

(12) EX PARTE REEXAMINATION CERTIFICATE (10152nd)
United States Patent
Miller et al.

(10) Number: US 6,397,622 C1
(45) Certificate Issued: May 9, 2014

(54) WATER FLOW FOR AUGER TYPE POULTRY CHILLER

(75) Inventors: Michael E. Miller, London, AR (US); Andrew C. Estes, Russellville, AR (US)

(73) Assignee: Cooling & Applied Technology, Inc., Russellville, AR (US)

Reexamination Request:
No. 90/013,096, Dec. 18, 2013

Reexamination Certificate for:
Patent No.: 6,397,622
Issued: Jun. 4, 2002
Appl. No.: 09/637,345
Filed: Aug. 11, 2000

(51) Int. Cl.
*F25D 25/02* (2006.01)

(52) U.S. Cl.
USPC .............................................. 62/381; 62/63

(58) Field of Classification Search
None
See application file for complete search history.

(56) References Cited

To view the complete listing of prior art documents cited during the proceeding for Reexamination Control Number 90/013,096, please refer to the USPTO's public Patent Application Information Retrieval (PAIR) system under the Display References tab.

*Primary Examiner* — Beverly M. Flanagan

(57) ABSTRACT

A counter flow, re-circulating, externally refrigerated auger type chiller. The chiller has a tank that is semi-cylindrical in shape so that the walls of the tank conform closely to the circular cross section of the auger. By minimizing the gap between the walls of the tank and the outer edges of the rotating auger, the counter flowing chilled water is forced to flow in the helical path determined by the auger. This assures a longer residence time for the chilled water in the auger, more thorough and more intimate contact between the poultry carcasses and the chilled water, and thus more efficient transfer of heat from the poultry carcasses to the chilled water.

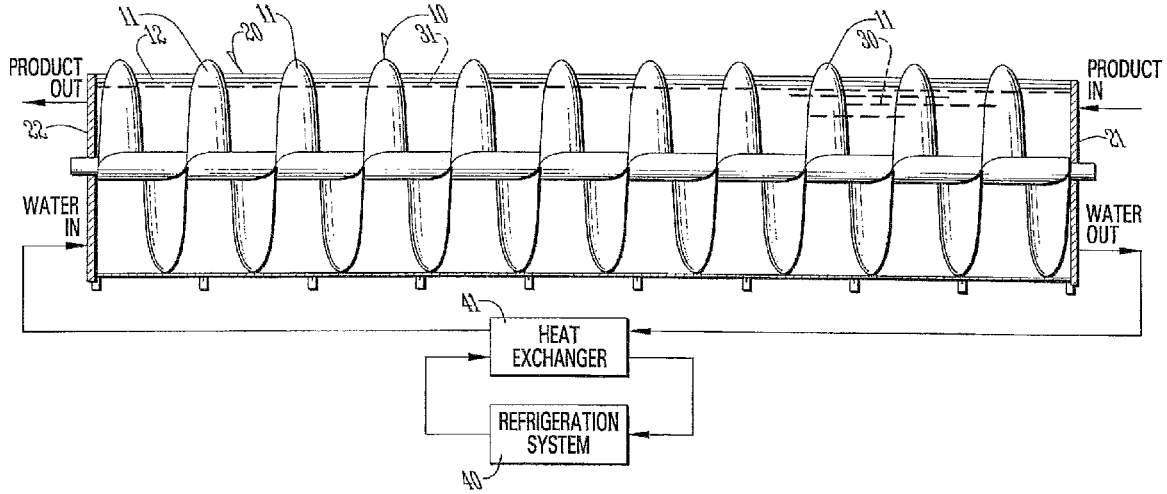

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4 lines 20-38:

The chilling water 30 is discharged from the tank 20 at the inlet end 21. At this point the chilling water 30 has been warmed by contact with the freshly killed poultry carcasses. The chilling water 30 is then circulated to a refrigeration system 40, which may be, for example, an ammonia refrigeration unit. The refrigeration system 40 may provide refrigeration to the warmed chilling water 30 directly or may operate through a heat exchanger 41. The refrigerated chilling water 30 exits from the refrigeration system and is re-circulated to the outlet end 22 of the tank 20. At this point the poultry carcasses have been cooled and are removed from the tank 20 *by an unloader as shown in FIG. 4 of U.S. Patent Application No. 09/298,364*. Since the chilling water 30 is newly refrigerated at this point, the maximum transfer of heat from the poultry carcasses to the chilling water is possible. As the chilling water 30 moves from the outlet end 22 to the inlet end 21, it moves counter to the direction of motion of the poultry carcasses. Such a counter flow is known to maximize the transfer of heat from the poultry carcasses to the chilling water 30.

AS A RESULT OF REEXAMINATION, IT HAS BEEN DETERMINED THAT:

Claim 1 is determined to be patentable as amended.

Claim 2, dependent on an amended claim, is determined to be patentable.

New claims 3-8 are added and determined to be patentable.

1. An auger type food product chiller, comprising:
a tank comprising longitudinal side walls having an inlet end and an outlet end, an inlet wall closing said inlet end, an outlet wall closing said outlet end, wherein said longitudinal side walls *comprise an inner surface and an outer surface, wherein said longitudinal side walls*, said inlet wall and said outlet wall together form a semi-cylinder having an inner surface and an outer surface;
an auger comprising *a shaft and a helical blade, wherein said helical blade forms* at least one flight having outer edges, *wherein said helical blade and said inner surface of said tank side walls forms a helical path between said inlet end of said tank and said outlet end of said tank*, said auger mounted for rotation within said tank and having an axis of rotation whereby rotation of said auger moves a food product *along said helical path* from said inlet end of said tank to said outlet end of said tank;
*a volume of chilling water, wherein said tank is filled with said volume of said chilling water to a water level above said shaft of said auger and below a top of said at least one flight of said auger, wherein an entirety of said inner surface of said tank side walls is positioned parallel to said outer edges of said at least one flight of said auger and wherein said entirety of said inner surface of said tank side walls conforms closely to said outer edges of said one or more flights of said auger, thereby forcing said chilling water to flow along said helical path when said auger rotates and impeding a flow of said chilling water between said tank side walls and said outer edges of said at least one flight of said auger when said auger rotates*;
means for removing the food product from said outlet end;
means for discharging chilling water from said inlet end of said tank;
refrigerating means external to said outer surface of said tank for refrigerating the chilling water discharged from said inlet end of said tank; *and*
means for re-circulating chilling water from said refrigerating means and introducing chilling water into said outlet end of said tank.

*3. The auger type food product chiller of claim 1, wherein said means for removing the food product from said outlet end comprises an unloader.*

*4. The auger type food product chiller of claim 1, wherein said means for discharging chilling water from said inlet end of said tank comprises a first chilling water line.*

*5. The auger type food product chiller of claim 1, wherein said means for re-circulating chilling water from said refrigerating means and introducing chilling water into said outlet end of said tank comprises a second chilling water line.*

*6. The auger type food product chiller of claim 1, wherein said refrigerating means external to said outer surface of said tank for refrigerating the chilling water discharged from said inlet end of said tank comprises a refrigeration system.*

*7. The auger type food product chiller of claim 1, wherein said refrigerating means external to said outer surface of said tank for refrigerating the chilling water discharged from said inlet end of said tank comprises a heat exchanger.*

*8. An auger type food product chiller, comprising:
a tank comprising longitudinal side walls having an inlet end and an outlet end, an inlet wall closing said inlet end, an outlet wall closing said outlet end, wherein said longitudinal side walls, said inlet wall and said outlet wall together form a semi-cylinder having an inner surface and an outer surface;
an auger comprising a shaft and a helical blade, wherein said helical blade forms at least one flight having outer edges, wherein said helical blade and said inner surface of said tank side walls forms a helical path between said inlet end of said tank and said outlet end of said tank, said auger mounted for rotation within said tank and having an axis of rotation whereby rotation of said auger moves a food product along said helical path from said inlet end of said tank to said outlet end of said tank;
a volume of chilling water, wherein said tank is filled with said volume of said chilling water to a water level above said shaft of said auger and below a top of said at least one flight of said auger, wherein an entirety of said inner surface of said tank side walls is positioned parallel to said outer edges of said at least one flight of said auger and wherein said entirety of said inner surface of said tank side walls conforms closely to said outer edges of said one or more flights of said auger, thereby forcing said chilling water to flow along said helical path when said auger rotates and impeding a flow of said chilling* water between said tank side walls and said outer edges of said at least one flight of said auger when said auger rotates;
an unloader for removing the food product from said outlet end;
a first chilling water line for discharging chilling water from said inlet end of said tank;
a refrigeration system external to said outer surface of said tank for refrigerating the chilling water discharged from said inlet end of said tank; and
a second chilling water line for re-circulating chilling water from said refrigerating means and introducing chilling water into said outlet end of said tank.

\* \* \* \* \*